(12) United States Patent
Biener

(10) Patent No.: US 7,392,971 B2
(45) Date of Patent: Jul. 1, 2008

(54) INFINITELY VARIABLE DIRECTIONAL VALVE

(75) Inventor: Rainer Biener, Steinfeld (DE)

(73) Assignee: Bosch Rexroth AG, Stuttgart (DE)

( * ) Notice: Subject to any disclaimer, the term of this patent is extended or adjusted under 35 U.S.C. 154(b) by 283 days.

(21) Appl. No.: 10/551,992

(22) PCT Filed: Apr. 5, 2004

(86) PCT No.: PCT/DE2004/000708

§ 371 (c)(1),
(2), (4) Date: Oct. 21, 2005

(87) PCT Pub. No.: WO2004/092591

PCT Pub. Date: Oct. 28, 2004

(65) Prior Publication Data

US 2006/0289073 A1    Dec. 28, 2006

(30) Foreign Application Priority Data

Apr. 10, 2003 (DE) ................. 103 16 770
May 21, 2003 (DE) ................. 103 22 970

(51) Int. Cl.
*F16K 31/12* (2006.01)

(52) U.S. Cl. ............ 251/30.04; 251/30.01; 137/630.19; 137/596; 137/596.16

(58) Field of Classification Search ............. 251/30.01, 251/30.03, 30.04; 137/596, 596.14, 596.16, 137/625.6, 625.64, 630.19
See application file for complete search history.

(56) References Cited

U.S. PATENT DOCUMENTS

| 2,575,272 A | * | 11/1951 | Harris | ............. 251/30.04 |
| 2,968,464 A | * | 1/1961 | Olson | ............. 251/30.04 |
| 4,699,351 A | | 10/1987 | Wells | |
| 4,746,093 A | * | 5/1988 | Scanderbeg | ............. 251/30.04 |
| 5,048,790 A | * | 9/1991 | Wells | ............. 251/30.04 |

FOREIGN PATENT DOCUMENTS

| DE | 196 27 306 A1 | 1/1998 |
| DE | 100 30 059 A1 | 12/2001 |
| DE | 100 48 600 A1 | 4/2002 |
| EP | 0 764 785 A2 | 3/1997 |

* cited by examiner

*Primary Examiner*—John K Fristoe, Jr.
(74) *Attorney, Agent, or Firm*—Oliff & Berridge, PLC

(57) ABSTRACT

Disclosed is an infinitely variable directional valve comprising a seat slide on which a valve cone is formed which is prestressed counter to a valve seat in the initial position of the directional valve. The directional valve is configured with a pilot control device wherefore a pilot control valve seat which interacts with a pilot control valve cone is provided inside the closing cone.

12 Claims, 4 Drawing Sheets

INFINITELY VARIABLE DIRECTIONAL VALVE

The invention relates to an infinitely variable directional valve in accordance with the preamble of claim 1.

Proportionally variable directional valves of this type can be used, for example, as pilot valves for the pilot control of valve main stages or as an independent control element in hydraulic drives. It is required in this case that the pressure pipes to the consumer are shut off in a leakage-free manner. The fact that it is leakage free permits to maintain a load at a predetermined relative position with respect to a working machine. The fact that no leakage occurs cannot be guaranteed solely by a proportional valve, because a leakage flow through the circumferential faces of the valve slide cannot be excluded.

A leakage-free clamping of the consumer is necessary, for instance, when pipes are laid by means of an excavator in which the arm of the excavator positions a piece of pipe and keeps it in position until it is welded. In the case of leakage, this relative position would vary with respect to the already laid piece of pipe.

In conventional mobile control blocks, as they are known, for instance, from the applicant's data sheet RD 64 127 (hydro valves for mobile applications), a load holding valve is provided for a leakage-free shut-off between the consumer and a proportionally variable directional valve.

In DE 196 27 306 A1 an infinitely variable directional valve comprising an inlet passage, a consumer passage and a discharge passage is disclosed, wherein the connection between the passages can be controlled to be opened and closed by a valve slide. In the consumer passage a stop valve whose valve cone is prestressed counter to a valve seat is arranged. In the valve cone a pilot control valve body is prestressed counter to a pilot control valve seat. In order to permit a fluid flow from the consumer via the consumer passage to the discharge passage of the valve arrangement, the valve slide is actuated, wherein a tappet interacting with the valve slide first lifts the pilot control valve body off its valve seat so that the pressure in the valve body of the stop valve is compensated. With another stroke of the valve slide and thus of the tappet, the pressure compensation is largely maintained because of an only small discharge orifice in the valve slide so that the valve body can be lifted off its seat.

It is a drawback in the solutions described above that the additionally provided stop valves require considerable expenses in terms of devices and moreover enlarge the constructional space of the valve arrangement.

Compared to this, the object underlying the invention is to provide an infinitely variable directional valve which permits a leakage-free shut-off of a supply port vis-á-vis a discharge port with a minimum expenditure in terms of devices.

This object is achieved by an infinitely variable directional valve comprising the features of claim 1.

In accordance with the invention, the infinitely variable directional valve includes a seat slide, wherein a closing cone of the seat slide is prestressed counter to a valve seat and the connection from the inlet to the discharge is controlled to be opened via a slide control edge. In the solution according to the invention, moreover a pilot control valve seat is provided in the area of the closing cone. A pilot control valve body which is adapted to be lifted off the pilot control valve seat for opening the pilot control device is prestressed counter to this pilot control valve seat.

According to the invention, thus the function of the stop valve permitting a leakage-free shut-off is integrated in the seat slide of the directional valve, i.e. the 2/2 port proportional valve according to the invention acts both as a stop valve and as a proportional valve.

In an especially preferred variant of the invention, the pilot control valve body can be lifted off its pilot control valve seat for compensating the pressure of the seat slide in the initial position of the closing cone. I.e., according to the invention, no axial displacement of the seat slide is reqired to open the pilot control device. This represents a substantial difference from the solution according to DE 196 27 306 A1, because with this solution for opening the pilot control device the valve slide had to be actuated so that already a discharge cross-section was controlled to be opened by the directional control valve.

According to the invention, the pilot control valve body lifted off the valve seat abuts against a driving shoulder of the seat slide after a predetermined stroke so that the seat slide is then driven by the pilot control valve body and, as a consequence, the directional control valve function depends on the stroke of the pilot control valve body.

In an especially simple embodiment the seat elide comprises a control collar including control notches at a distance from the closing cone formed at an end portion and an axial bore which is stepped back to the pilot control valve seat in the area of the closing cone passes through the seat slide. In the directional control valve function the discharge cross-section is determined via the control edge formed by the control notches.

In this preferred embodiment an overflow chamber which is connected to the axial bore through cross bores of the seat slide is restricted in the axial direction by the closing cone and the control collar.

Furthermore it is preferred that the pilot control valve body is guided outside the seat slide.

Especially in the latter variant the pilot control valve body can be actuated by a proportional magnet the tappet of which is connected to the pilot control valve body. In this case the proportional magnet is designed as a drawing magnet.

In a concrete solution the seat slide shows a engaging dog in which an end portion of the pilot control valve body engages, wherein in the initial position with a closed pilot control device a rear wall of the engaging dog embodying the driving shoulder is formed at an appropriate distance from a radial shoulder of the pilot control valve body. This radial shoulder abuts at the driving shoulder during axial displacement of the pilot control valve body so that then the seat slide is driven.

In the directional control valve function the axial displacement of the seat slide is performed against the force of a control spring, which becomes active only after a predetermined stroke, however.

In addition to the control spring, a tracking spring having a lower spring rate may be provided by which the pilot control valve body and thus the seat slide are prestressed into their initial position.

Other advantageous embodiments of the invention are the subject matter of further subclaims.

Hereinafter a preferred embodiment of the invention will be explained in detail by way of schematic drawings in which.

Figure 1:
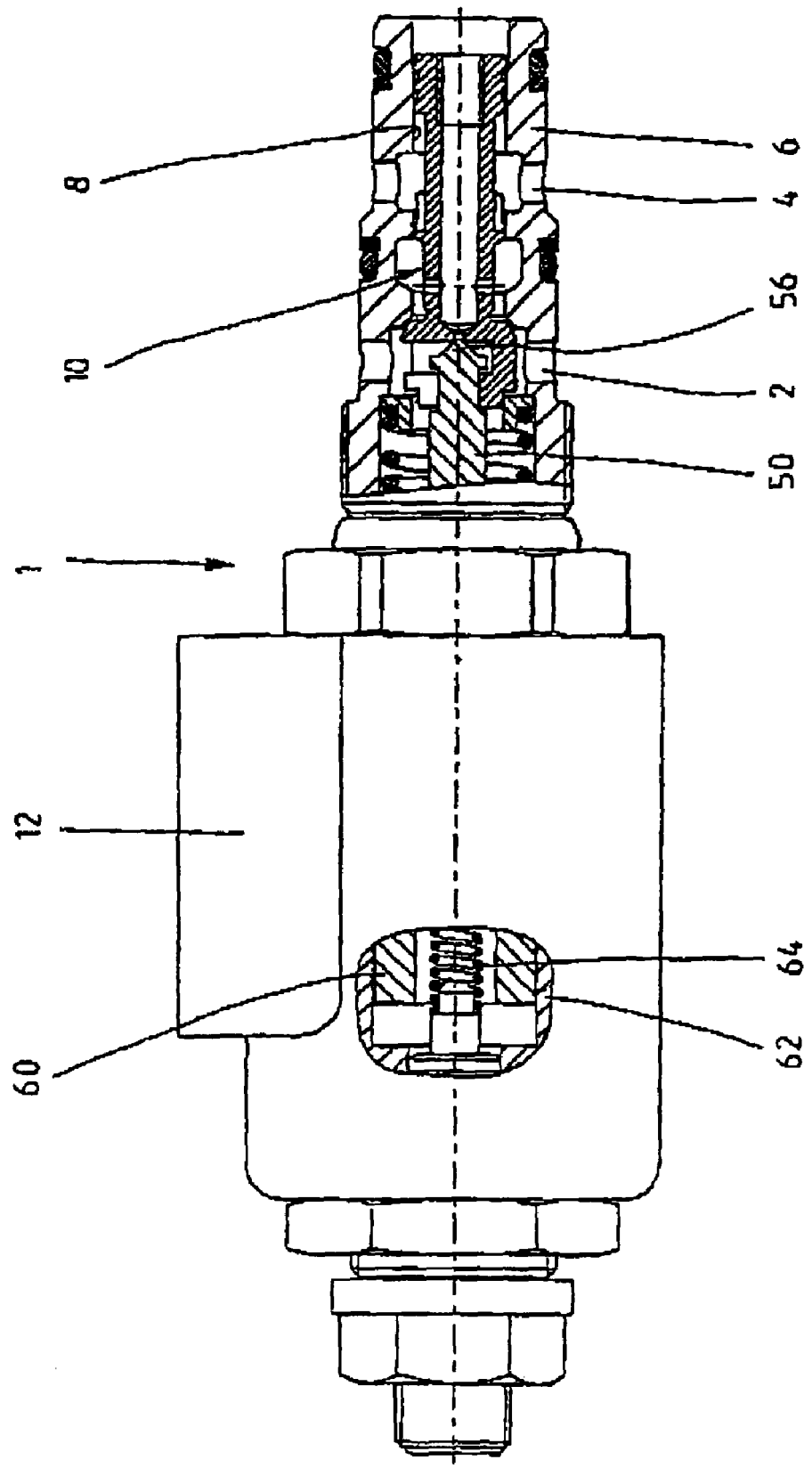
FIG. 1 shows a partially cut side view of an infinitely variable directional valve including two ports according to the invention.

FIG. 1 shows a partial section of an infinitely variable directional valve 1 including an inlet port 2 and a discharge port 4. It is assumed that the inlet port 2 is connected to a consumer and thus a load pressure is applied, while the discharge port 4 is connected to a reservoir or the like. The directional valve 1 has a cartridge design and includes a valve liner 6 at which the two ports 2, 4 are formed and in the bore 8 of which a seat slide 10 is guided in an axially movable manner. The seat slide 10 is actuated by means of a proportional magnet 12 which is a drawing magnet in the represented embodiment. The proportional magnet 12 is screwed to the valve liner 6. Further details of the directional valve 1 will be explained by way of the enlarged representation in FIG. 2.

The bore 8 of the valve liner 6 is extended in the radial direction to a discharge chamber 14, an overflow chamber 16 and an inlet chamber 18, wherein the discharge chamber 14 opens into the radially opening discharge port 4 designed as a bore star and the inlet chamber 18 opens into the inlet port 2 likewise designed as a bore star. A valve seat 22 is formed at a bridge 20 of the valve liner 6 between the overflow chamber 16 and the inlet chamber 18. The overflow chamber 16 is separated from the discharge chamber 14 by a control bridge 24 of the valve liner 6 which, together with the seat slide 10 described in greater detail hereinafter, confines the discharge cross-section in the directional control valve function.

Figure 2:
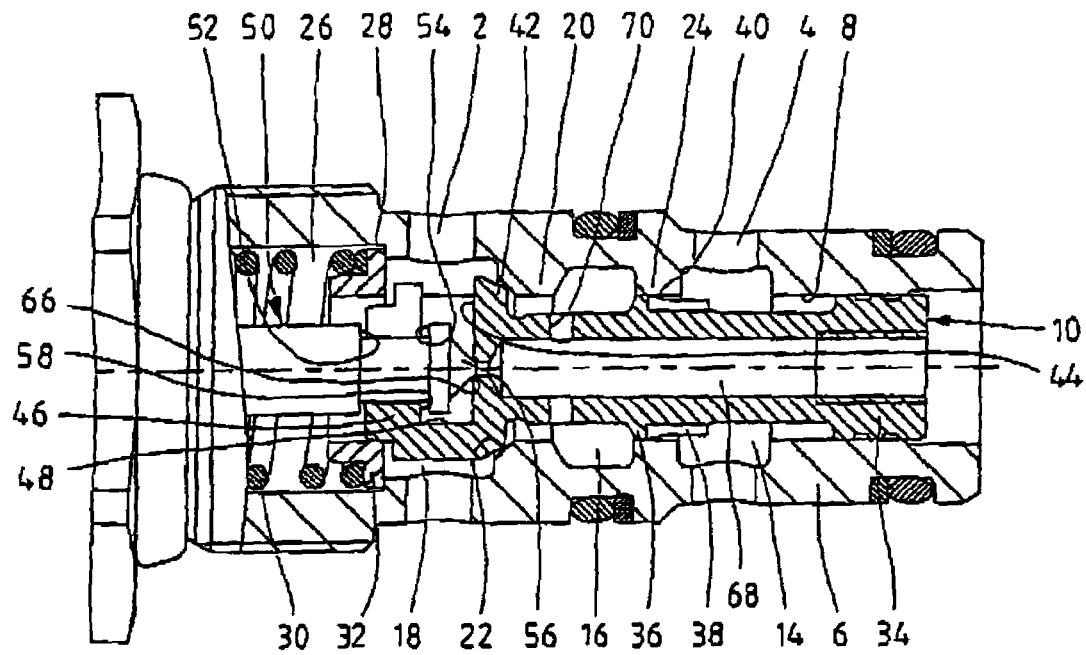
FIG. 2 shows a section across a valve liner of the valve shown in FIG. 1.

In FIG. 2 a spring chamber 26 which is extended via a radial shoulder 28 in the radial direction vis-á-vis the inlet chamber 18 is connected at the left to the inlet chamber 18.

A control spring 30 is supported on said radial shoulder 28 by a valve spring retainer 32.

At its end portion distant from the valve seat 22 the seat slide 10 includes a guiding collar 34 which is in sealing contact with the inner circumferential face of the bore 8.

At a distance from the guiding collar 34 the seat slide 10 includes a control collar 36 which is formed, in the shown initial position, approximately in the area of the bridge 24. The control collar 36 is provided with control notches 38 toward the discharge chamber 14 by which a control edge 40 is formed. Said control edge 40 is covered by the circumferential area of the control bridge 24 in the shown initial position so that the connection between the overflow chamber 16 and the discharge chamber 14 is shut off. This connection is opened only after passing an initial stroke of the seat slide 10.

In the area of the left end portion of the seat slide 10 a closing cone 42 is provided which in the initial position is supported with its conical surface on the valve seat 22 so that the latter is closed.

At a front face 44 of the closing cone 42 an engaging dog 46 having a radially extending dog recess 48 open to one side is formed. This engaging dog 46 engages with a tappet 50 having an annular groove at its shown end portion which groove is restricted by two annular shoulders 52 and 54. The annular shoulder 54 on the right in FIG. 2 is formed by an annular bridge to which a pilot control valve cone 56 is connected. The engaging dog 46 includes a driving shoulder 58 which is arranged, in the shown initial position, at an axial distance from the annular shoulder 54 of the tappet 50.

The tappet 50 is guided with an armature 60 in a pole tube 62 of the proportional magnet 12 in an axially movable manner and can be displaced out of its initial position to the left by applying current to the coil (not shown) of the proportional magnet 12 in the representation according to FIG. 1. The tappet 50 including the pilot control valve cone 56 and the armature 60 are prestressed into the shown initial position via a tracking spring 64. In this initial position the pilot control valve cone 56 is supported on a pilot control valve seat 66 opening in the front face 44 of the seat slide 10. Said pilot control valve seat is extended in FIG. 2 to the right toward an axial bore 68 of the seat slide 10. Said axial bore opens into the rear front face of the seat slide 10 on the right in FIG. 2. In the jacket of the seat slide 10 in the area between the closing cone 42 and the control collar 36 jacket bores 70 are provided through which the axial bore 68 is connected to the overflow chamber 16.

According to the above-described statements, in the initial position of the directional valve according to the invention no current is supplied to the proportional magnet 12 so that the pilot control valve cone 56 is seated on the pilot control valve seat 66. The closing cone 42 is seated on the valve seat 22 and the control edge 40 has controlled the connection between the discharge chamber 14 and the overflow chamber 16 to be closed. In the case in which a load pressure is applied to the inlet port 2, this load is shut off leakage-free toward the reservoir by the two valve seats (closing cone 42/valve seat 22; pilot control valve cone 56/pilot control valve seat 66). The pilot control valve cone 56 and the closing cone 42 are pressed against the associated valve seats 66 and 22, respectively, by a force depending on the load pressure and by the force of the tracking spring 64.

Figure 3:
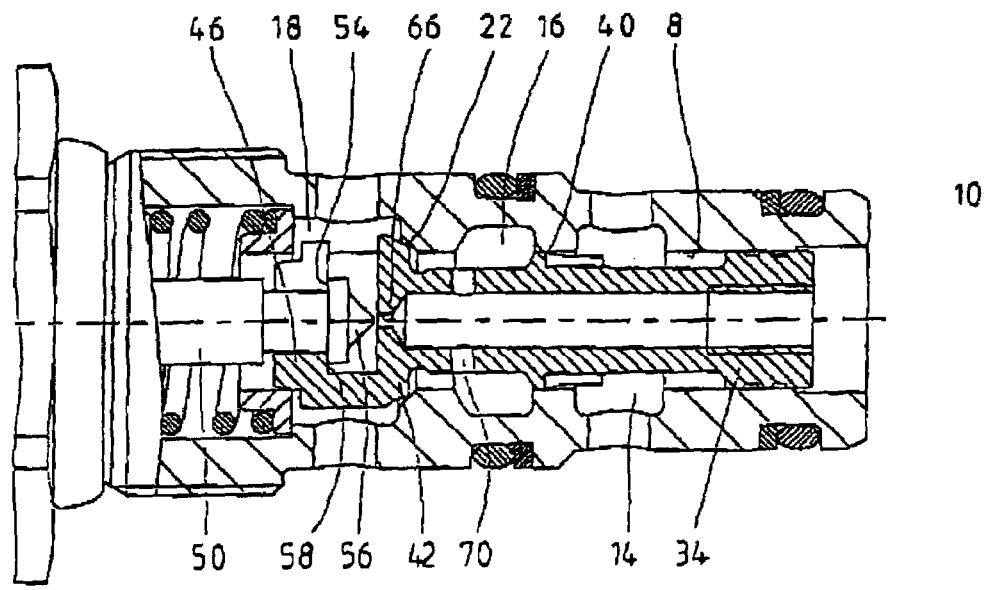
FIG. 3 shows the directional valve of FIG. 1 having an opened pilot control valve seat.
Figure 4:
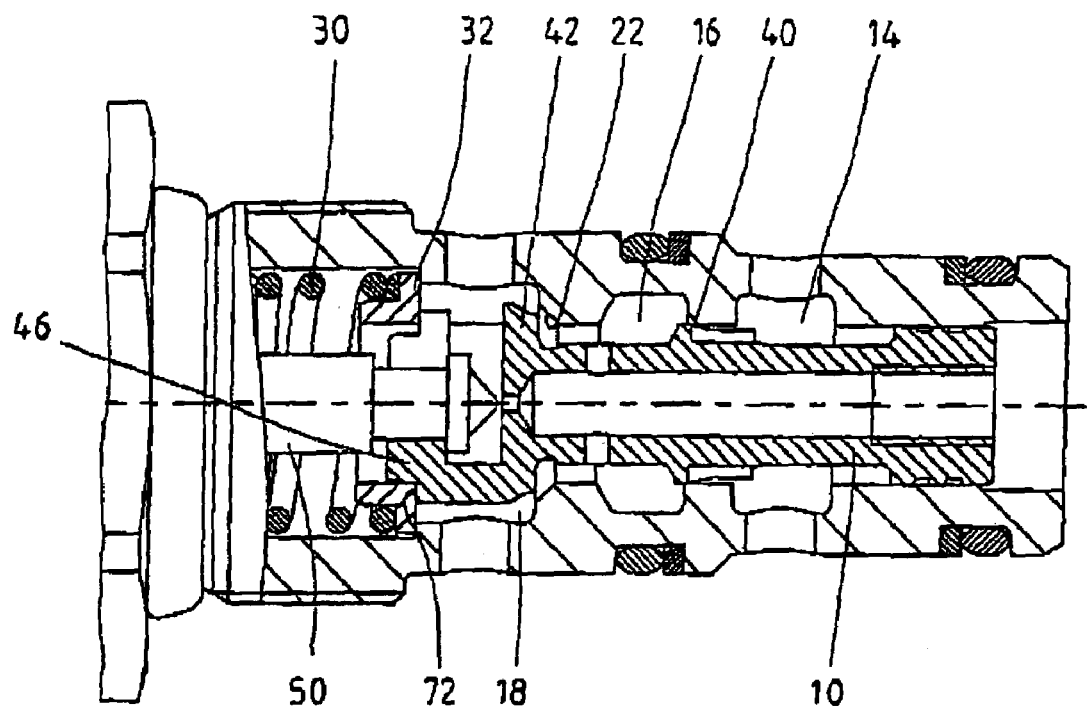
FIG. 4 shows the directional valve of FIG. 1 with a completely opened pilot control valve seat and at the beginning of the directional control valve function.

For reducing the load, i.e. for opening the inlet toward the discharge, current is applied to the proportional magnet, wherein the current intensity is chosen such that the tappet 50 can be lifted with the pilot control valve cone 56 off its pilot control valve seat 66 against the force corresponding to the load pressure. The magnetic force has to be selected such that the pilot control cone 56 can be reliably lifted off even in the case of the maximum effective load pressure, for instance amounting to 450 bars. FIG. 3 shows the directional valve 1 with the pilot control device being opened.

When the pilot control valve cone 56 is lifted off, the pilot control valve seat 66 is opened so that pressure fluid can enter from the inlet chamber 18 into the axial bore 68 so that the load pressure is applied to the front face of the seat slide 10 on the right in FIG. 3. This load pressure is also provided in the overflow chamber 16 via the jacket bores 70 so that the load pressure is likewise applied to the rear side of the closing cone 42. As one can take from FIG. 3, the diameter of the valve seat 22 in larger than the diameter of the guiding collar 34, i.e. of that part of the seat slide 10 which is guided in the bore 8. Thus, the pressure in the seat slide 10 is compensated so that for its axial displacement a comparatively smaller force which can be applied by the proportional magnet is necessary.

The introduction of load pressure into the overflow chamber 16 has the advantage that even if a change of the valve seat diameter in resulting in the course of the service life of the directional valve 1, a pressure relief of the seat slide 10 is still ensured by introducing the load pressure into the overflow chamber 16—consequently a kind of adaptation to such occurrence of wear takes place.

During further displacement of the tappet 50 it abuts—as represented in FIG. 3—with its annular shoulder 54 against the driving shoulder 58 of the engaging dog 46 so that subsequently the seat slide 10 is driven by the tappet So and is lifted off its valve seat 22. In this case, however, the connection between the discharge chamber 14 and the overflow chamber 16 is still closed by the control edge 40. This first stroke of the seat slide 10 is performed without any further increase in current at the proportional magnet.

After a predetermined stroke the engaging dog 46 abuts with a shoulder 72 against the valve spring retainer 32 so that the further axial displacement has to take place against the force of the comparatively strong control spring 30. In this position the closing cone 42 is lifted off the valve seat 22 so that a connection from the inlet chamber 18 to the overflow chamber 16 is controlled to be opened via the valve seat 22. The connection from the overflow chamber 16 to the discharge chamber 14 is not yet or at least to a negligible extent controlled to be opened by the control edge 40, however. The force of the control spring 30 is designed such that the magnetic force which was just sufficient to pull the tappet 50 in the afore-described manner with the seat slide 10 into the contacting position with the valve spring retainer 32 does not suffice to permit a further axial displacement of the seat slide 10 into its directional control valve function.

Figure 5:
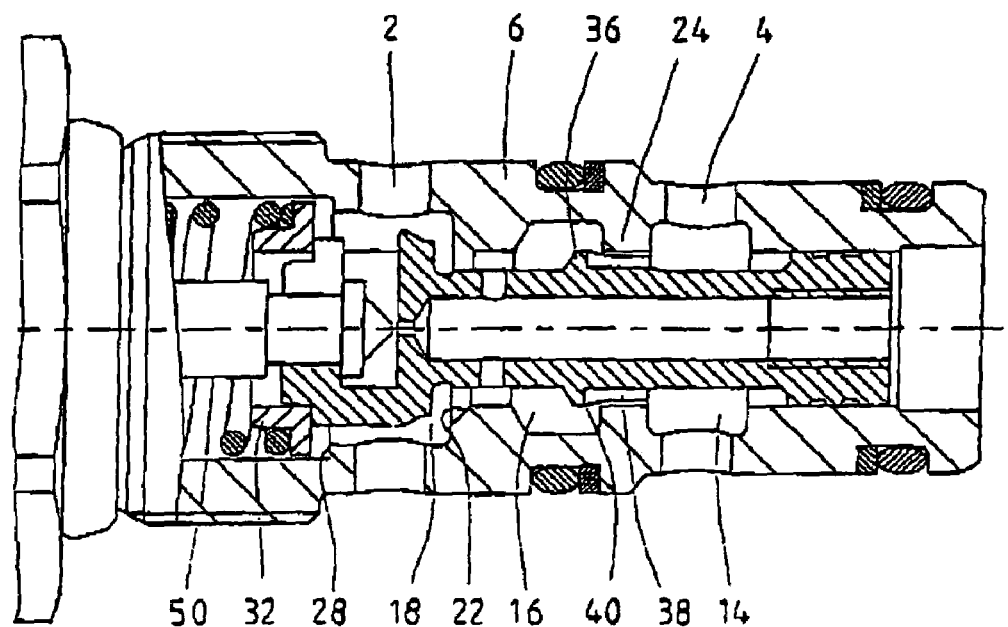
FIG. 5 shows the directional valve of FIG. 1 in the directional control valve function and FIG. 6 is a characteristic curve of the infinitely variable directional valve.

In order to initiate the directional control valve function the current intensity at the proportional magnet has to be further increased so that the tappet 50 and the seat slide 10 can be moved against the force of the control spring 30. This operating condition (directional control valve function) is shown in FIG. 5. In the case of the further axial displacement of the tappet 50, the valve spring retainer 32 lifts off the radial shoulder 28 of the valve liner 6 and, simultaneously, a discharge cross-section is controlled to be opened via the control edge 40 and the control notches 38 of the control collar 36 so that the pressure fluid is allowed to flow off through the inlet port 2, the inlet chaser 18, the opened valve seat 22, the overflow chamber 16, the opened discharge cross-section between the control bridge 24 and the control collar 36 to the discharge chamber 14 and from there through the discharge port 4 to the reservoir. The closing cone 42 is spaced apart from the valve seat 22 so far that it has a negligible influence on the flow of pressure fluid.

Measurements have resulted in the fact that the directional valve 1 according to the invention has a flow behavior which, to a certain extent, is independent of the load pressure. The seat slide 10 is pressurized according to the applied load pressure by flow forces against the direction of movement predetermined by the proportional magnet 12 in the closing direction, thereby the discharge cross-section controlled to be opened by the control notches 38 being reduced so that the discharge quantity remains approximately equal independently of the load pressure. This keeping the volume flow constant independently of the load pressure does not function as accurately as in the case of a custom-made pressure maintaining valve, of course,—but for a lot of applications the accuracy to be achieved is sufficient.

For returning the directional valve 1 to its initial position shown in FIG. 1, the above-described control is performed in a reverse order, wherein first the control spring 30 is positioned with the valve spring retainer 32 at the radial shoulder 28 and then the closing cone 42 is seated onto the valve seat 22. Subsequently, the pilot control valve seat 66 is closed by the pilot control valve cone 56, the tappet 50 and the seat slide 10 being returned to their initial position by the force of the tracking spring 64.

Figure 6:
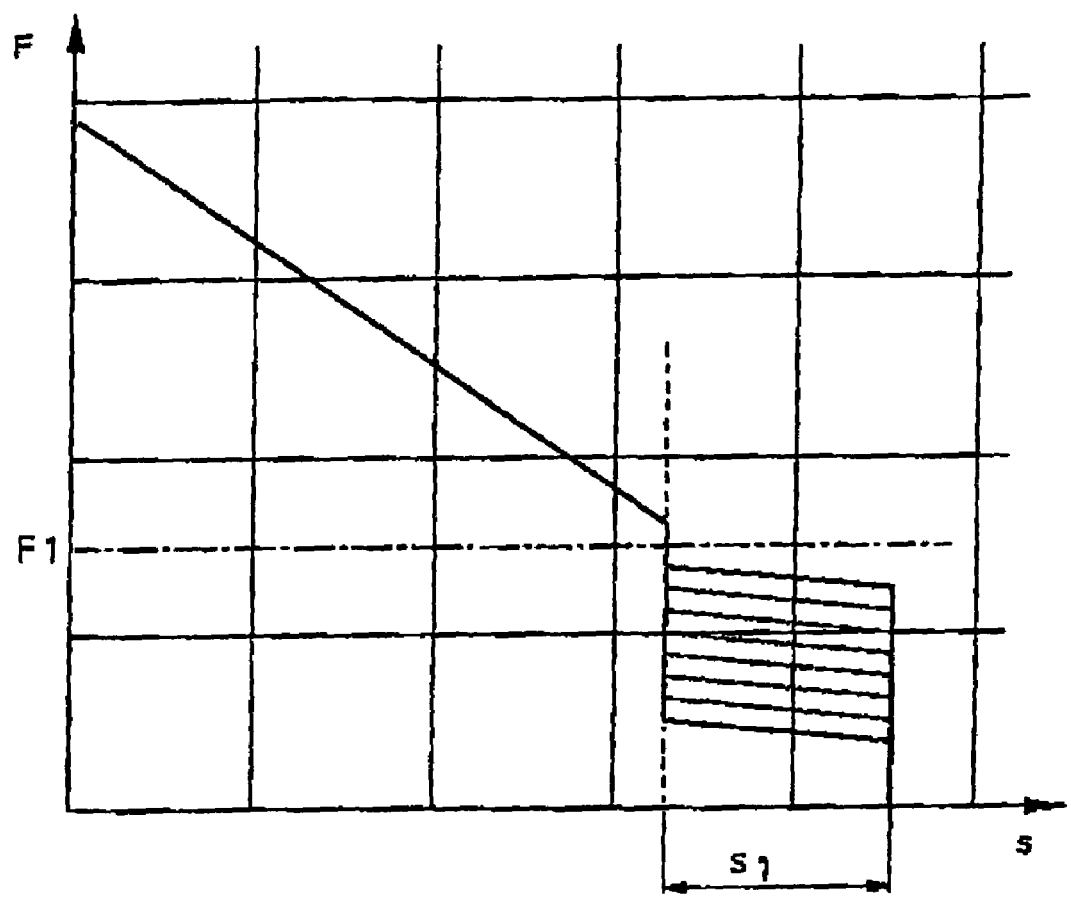

The characteristic curve of the afore-described directional valve is represented in FIG. 6, the required magnetic force being represented above the stroke of the tappet 50. In the initial position the directional valve is closed, the tappet 50 is extended to its maximum value. During opening the pilot control device, i.e. while the pilot control valve cone 56 is initially lifted off the pilot control valve seat 66, the seat slide 10 remains in its initial position. Depending on the load pressure applied, a corresponding minimum force has to be applied by the proportional magnet to cause this initial stroke of the tappet 50. This magnetic force is the greater, the higher the load pressure applied. Therefore, in FIG. 6 the characteristic curves for plural load pressures of this type are shown. After a predetermined initial stroke s1 the engaging dog 46 abuts with the shoulder 72 against the valve spring retainer 32 so that the further displacement of the tappet 50 and thus the axial displacement of the seat slide 10 is only possible by increasing the magnetic force. That is to say, after the stroke s1 the magnetic force is increased once again so that the seat slide 10 is displaced counter to the force of the control spring 30. The stroke of the tappet 50 and thus of the seat slide 10 is substantially proportional to the magnetic force F in this directional valve function.

If, at the beginning of the opening operation, a force F1 is chosen already, the pilot control device can also be opened with the maximum possible load pressure of, for instance, 450 bars.

Disclosed is an infinitely variable directional valve comprising a seat slide on which a valve cone is formed which is prestressed counter to a valve seat in the initial position of the directional valve. The directional valve is configured with a pilot control device wherefore a pilot control valve seat which interacts with a pilot control valve cone is provided inside the closing cone.

LIST OF REFERENCE NUMERALS

1 infinitely variable directional valve
2 inlet port
4 discharge port
6 valve liner
8 bore
10 seat slide
12 proportional magnet
14 discharge chamber
16 overflow chamber
18 inlet chamber
20 bridge
22 valve seat
24 control bridge
26 spring chamber
28 radial shoulder
30 control spring
32 valve spring retainer
34 guiding collar
36 control collar
38 control notches
40 control edge
42 closing cone
44 front face
46 engaging dog
48 dog recess
50 tappet
52 annular shoulder
54 annular shoulder
56 pilot control valve cone
58 driving shoulder
60 armature
62 pole tube
64 tracking spring
66 pilot control valve seat
68 axial bore
70 jacket bore
72 shoulder

The invention claimed is:

1. An infinitely variable directional valve comprising a valve body through which the connection from an inlet port to a discharge port can be controlled to be opened and comprising a blocking means for a substantially leakage-free shut-off of the inlet, the blocking means being designed to include a pilot control device, wherein the valve body is embodied as a seat slide and includes a closing cone which is prestressed counter to a valve seat, wherein the seat slide is separate from a control spring prior to energizing of a proportional magnet, wherein the seat slide has a control edge by which the connection between the inlet and the discharge can be controlled to be opened in a directional control valve function, wherein in the closing cone a pilot control valve seat is formed counter to which a pilot control valve body is prestressed, wherein the pilot control valve body is adapted to be lifted off the pilot control valve seat by energizing the proportional magnet in order to perform pressure compensation at the seat slide, and in that the seat slide is adapted to be driven by the pilot control valve body so as to raise the closing cone from the valve seat.

2. A directional valve, according to claim 1, wherein the pilot control valve body can be lifted off the pilot control valve seat in the closing position of the closing cone.

3. A directional valve according to claim 1, wherein the pilot control valve cone is guided outside the seat slide.

4. A directional valve according to claim 2, wherein after a predetermined stroke the pilot control valve body abuts against a driving shoulder of the seat slide so that the latter is movable into its directional control valve position.

5. A directional valve according to claim 1, wherein the seat slide comprises a control collar including control notches which is arranged at a distance from the closing cone and through which an axial bore is passed which is stepped back to a pilot control valve seat in the area of the closing cone.

6. A directional valve according to claim 5, wherein the closing cone and the control collar confine, in axial direction, an overflow chamber which is connected to the axial bore by means of at least one jacket bore of the seat slide.

7. A directional valve according to claim 5, comprising a proportional magnet the tappet of which is connected to the pilot control valve body.

8. A directional valve according to claim 7, wherein the proportional magnet is a drawing magnet.

9. A directional valve according to claim 7, wherein the seat slide includes an engaging dog in which the end portion of the pilot control valve cone or of the tappet on the side of the valve seat engages, wherein in an initial position a rear wall of the engaging dog forming the driving shoulder is formed at a distance corresponding to the initial stroke from an annular shoulder of the pilot control valve cone and of the tappet, respectively.

10. A directional valve according to claim 1, wherein the seat slide abuts against the control spring after a predetermined stroke.

11. A directional valve according to claim 10, wherein the end of the control spring on the side of the seat slide is supported on a valve spring retainer against which the seat slide abuts after the stroke.

12. A directional valve according to claim 1, wherein the pilot control valve cone is prestressed in the direction of the seat slide via a tracking spring.

* * * * *